US012461114B2

(12) United States Patent
Joris et al.

(10) Patent No.: US 12,461,114 B2
(45) Date of Patent: Nov. 4, 2025

(54) BIOLOGICAL SAMPLE PROCESSING SYSTEM AND MICROFLUIDIC CARTRIDGE THEREFOR

(71) Applicant: LUNAPHORE TECHNOLOGIES SA, Tolochenaz (CH)

(72) Inventors: Pierre Joris, Pully (CH); Deniz Eroglu, Lausanne (CH); Diego Dupouy, Préverenges (CH); Benjamin Pelz, Lausanne (CH); Marco Ammann, Lausanne (CH)

(73) Assignee: LUNAPHORE TECHNOLOGIES SA, Tolochenaz (CH)

( * ) Notice: Subject to any disclaimer, the term of this patent is extended or adjusted under 35 U.S.C. 154(b) by 876 days.

(21) Appl. No.: 17/754,176

(22) PCT Filed: Sep. 25, 2020

(86) PCT No.: PCT/EP2020/076978
§ 371 (c)(1),
(2) Date: Mar. 25, 2022

(87) PCT Pub. No.: WO2021/058782
PCT Pub. Date: Apr. 1, 2021

(65) Prior Publication Data
US 2022/0291246 A1    Sep. 15, 2022

(30) Foreign Application Priority Data
Sep. 27, 2019   (EP) ..................................... 19200101

(51) Int. Cl.
*G01N 35/00*   (2006.01)
*B01L 3/00*    (2006.01)
(Continued)

(52) U.S. Cl.
CPC .. *G01N 35/00029* (2013.01); *B01L 3/502715* (2013.01); *B01L 9/50* (2013.01);
(Continued)

(58) Field of Classification Search
None
See application file for complete search history.

(56) References Cited

U.S. PATENT DOCUMENTS 5,367,401 A   11/1994  Saulietis
5,768,033 A    6/1998  Brock
(Continued)

FOREIGN PATENT DOCUMENTS

EP   3 427 829        1/2019
JP   2003-029161 A    1/2003
(Continued)

OTHER PUBLICATIONS

International Search Report and Written Opinion of the International Searching Authority in PCT/EP2020/076978, dated Dec. 10, 2020 (25 pages).
(Continued)

*Primary Examiner* — Lore R Jarrett
(74) *Attorney, Agent, or Firm* — Nixon & Vanderhye PC

(57) ABSTRACT

Biological sample processing system comprising an imaging unit (2) comprising a digital image processing system and at least one microscope including at least one lens (14), a sample processing station (3) comprising a handling platform (3) including a support (17) and a displacement mechanism for moving the support (17), and a sample processing unit (7) mounted on the handling platform (5). The sample processing unit (7) comprises a tissue slide holder (11) for mounting thereon a tissue slide (34) with a biological sample (36) fixed thereon and a microfluidic cartridge holder (9) for mounting a microfluidic cartridge (4) thereon. The tissue
(Continued)

slide holder (11) is coupled to the microfluidic cartridge holder (9) via a coupling (13) allowing the microfluidic cartridge and the tissue support to be mounted and removed from the sample processing unit in an opened position, and in a closed position for the tissue support (34) to be in sealing contact with the microfluidic cartridge (4). The sample processing station comprises a plurality of said sample processing units mounted on the handling platform (5) and moveable from a position allowing mounting of the tissue slide, respectively microfluidic cartridge, or removal thereof, to a position in which the viewing window in the microfluidic cartridge holder (9) is positioned in alignment with the lens of said at least one microscope.

14 Claims, 5 Drawing Sheets

(51) Int. Cl.
  *B01L 9/00* (2006.01)
  *G01N 1/31* (2006.01)
(52) U.S. Cl.
  CPC .............. *B01L 9/527* (2013.01); *G01N 1/312* (2013.01); *B01L 2200/027* (2013.01); *B01L 2200/0689* (2013.01); *B01L 2200/16* (2013.01)

(56) References Cited

U.S. PATENT DOCUMENTS

| | | |
|---|---|---|
| 5,851,489 A | 12/1998 | Wolf et al. |
| 2008/0220469 A1* | 9/2008 | Heid .................. C12Q 1/04 435/40.52 |
| 2016/0272933 A1 | 9/2016 | Larimer et al. |
| 2017/0014824 A1 | 1/2017 | Boyd et al. |
| 2017/0328818 A1* | 11/2017 | Zhang .................. G01N 1/2813 |
| 2018/0364270 A1 | 12/2018 | Chiu et al. |

FOREIGN PATENT DOCUMENTS

| | | |
|---|---|---|
| JP | 2012-058114 A | 3/2012 |
| WO | 02/072264 | 9/2002 |
| WO | 2013/128322 | 9/2013 |
| WO | 2019/012005 A1 | 1/2019 |

OTHER PUBLICATIONS

Cappi, G. et al. "Ultra-fast and automated immunohistofluorescent multistaining using a microfluidic tissue processor" Scientific Reports. Mar. 14, 2019. vol. 9., No. 1., pp. 1-12 (12 pages).

\* cited by examiner

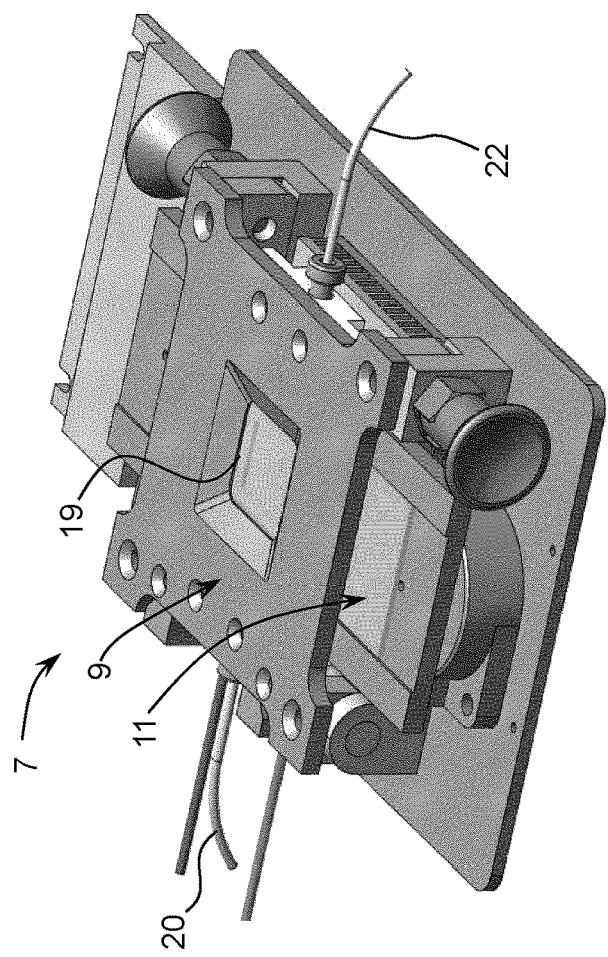
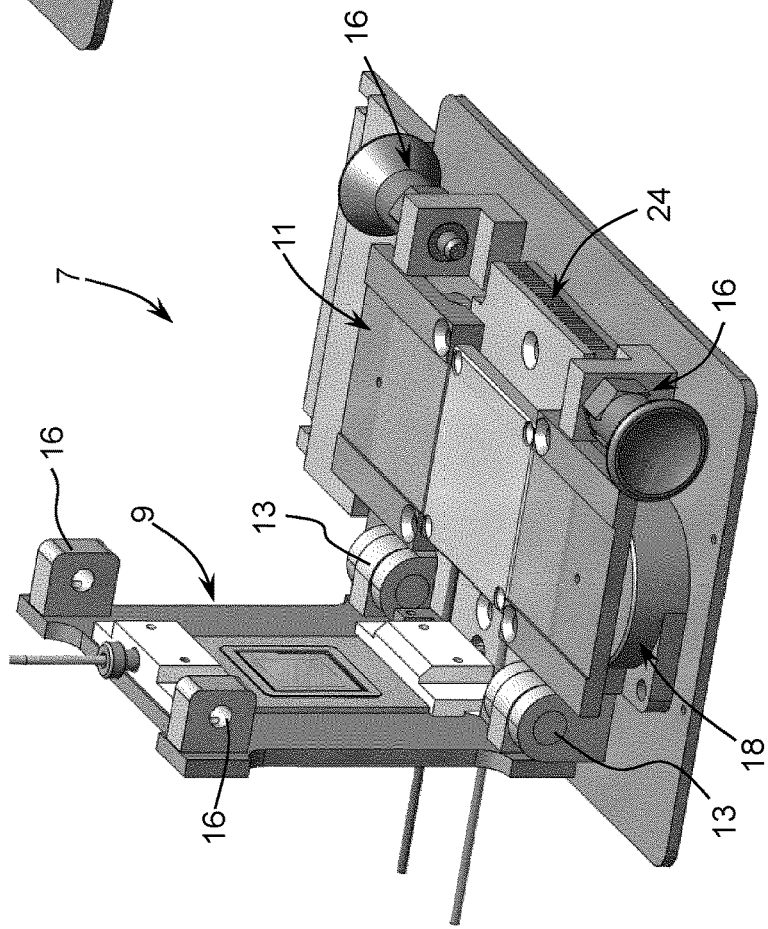
Fig. 3a
Fig. 3b

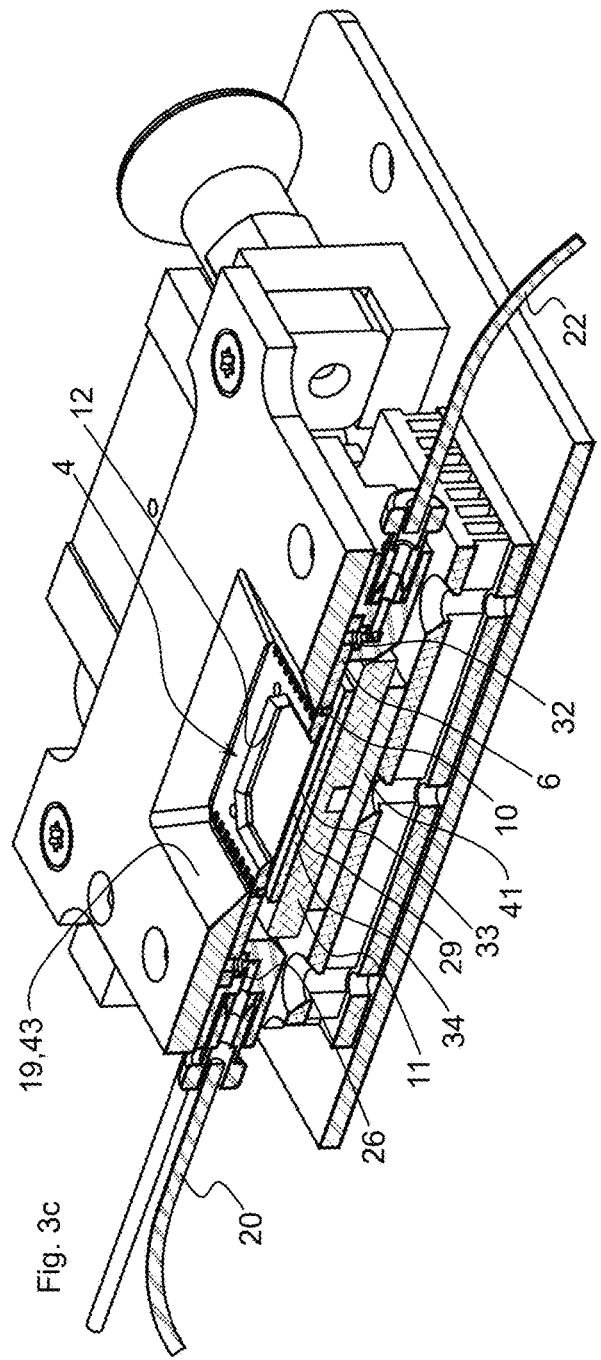
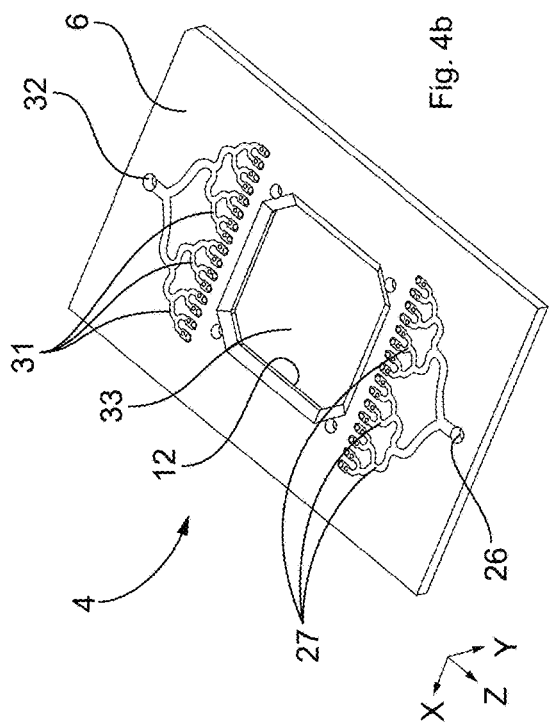
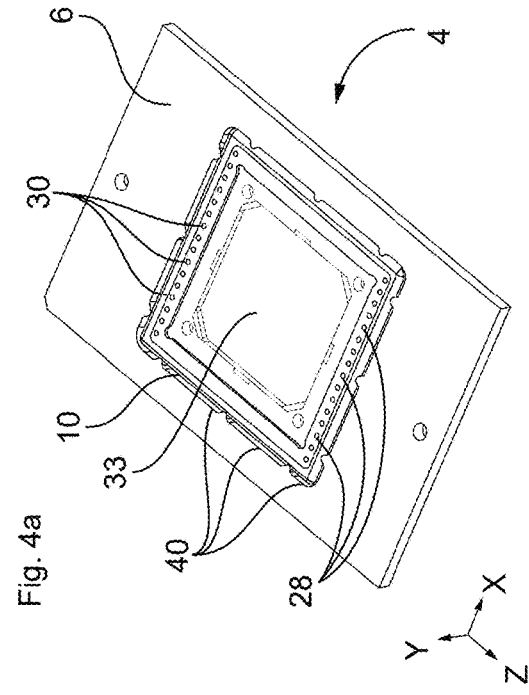

BIOLOGICAL SAMPLE PROCESSING SYSTEM AND MICROFLUIDIC CARTRIDGE THEREFOR

This application is the U.S. national phase of International Application No. PCT/EP2020/076978 filed Sep. 25, 2020 which designated the U.S. and claims priority to EP 19200101.4 filed Sep. 27, 2019, the entire contents of each of which are hereby incorporated by reference.

The present invention relates to a biological sample processing system for analyzing tissue samples fixed on a support, using an imaging system including a microscope.

Conventional supports for tissue sample analysis typically include glass slides, or coverslips, which may uncoated or may be coated, such as poly-lysine coated slides or gel coated slides, to fix the tissue samples on the support. Supports may however also be made of other materials.

Samples include whole tissue samples, surgical biopsies or needle biopsies of tissue types, blood samples or cell smears. Tissue samples may be provided as tissue cut into thin sections and subsequently applied to a support, tissue samples smeared on a support, tissue samples provided as fluids dropped or otherwise applied on to the support. Tissue samples may for instance be samples of breast tissue, lung tissue, tonsil tissue, colon tissue, lymph node tissue, prostate tissue, gut tissue, liver tissue or kidney tissue. Samples for analysis may be tumor samples, including biopsies from cancers, for example breast cancer, lung cancer, prostate cancer, ovarian cancer, colorectal cancer and melanoma. The present invention may also be applied to samples of microbial nature such as bacteria, or samples of living tissue such as tissue cultures.

A common form of fixing tissue samples for analysis is formalin fixed paraffin embedded (FFPE) samples.

Analysis of biological tissue samples include Immunohistochemistry (IHC) and Immunofluorescence.

IHC is a technique involving the use of specific probe molecules such as antibodies to detect the existence of specific biomarkers (e.g. antigens) that may be expressed by cells in a tissue sample. IHC is widely used in both clinical and research settings, for example to diagnose particular diseases such as a type of cancer or to investigate the correlation between disease prognosis and the expression of novel biomarkers. The dominant application area of IHC is cancer diagnosis; but it has other application areas including the detection of infectious agents such as viruses and aiding the diagnosis of other diseases such as Alzheimer's.

Immunofluorescence is an alternative technique to classical immunohistochemistry, especially for applications where it is desired to observe multiple molecular measurements on a single sample. However, it has several limitations which result in low multiplexity (i.e. the number of simultaneous molecular readouts). Its major limitation is the cross-talk between fluorophore signals. An overlap between the emission spectra of detection molecules decreases the specificity of each signal, thus making feasible a maximum of only 4-5 simultaneous readouts. Another limitation comes from the fact that each molecular target requires a primary antibody derived from a different species, severely limiting the multiplexity. This can be overcome if direct labeling of antibodies is used instead of sandwich assays; but this would result in much lower output signals due to a lack of amplification, leading to decreased sensitivity.

Multi-cycle multiplexing is a technique which can overcome certain limitations of classical multiplexing methods. The technique involves the elution of the target antibody or the inactivation of labeling molecules after each staining and imaging cycle. There are however several disadvantages associated with conventional multi-cycle staining and imaging technologies for tissue sections. A first drawback is the extremely long turnaround times, resulting from long incubation and washing cycles (usually up to several hours), which limit the throughput and may cause sample degradation over time. Further, repeated mounting/demounting of imaging coverslips steps further deteriorate tissue integrity. Manual sample handling during cycles also decreases reproducibility and reliability. Another consideration is the sample area to be imaged and accuracy of whole slide scanning. When whole slides or large areas of interest are imaged with high magnification objectives, overlaying/stitching software solutions are used to obtain the image. Removing and re-inserting the sample under the objective after each staining cycle can result in alignment errors between images corresponding to different markers and decreases the accuracy of multiplexing.

It is an object of this invention to provide a biological sample processing system for imaging and analyzing tissues samples fixed on a support, that is rapid and efficient, and allows accurate imaging of tissue samples over a large area.

It is advantageous to provide a biological sample processing system that is versatile and can be used or adapted for different applications.

It is advantageous to provide a biological sample processing system that can perform sequential multiplex processing of a biological sample with a sequence of reagents that generates rapid, accurate and reliable results.

It is another object of this invention to provide a microfluidic cartridge for a biological sample processing system for imaging and analyzing tissues samples fixed on a support, which enables rapid, efficient, and accurate imaging of tissue samples over a large area.

It is advantageous to provide a microfluidic cartridge that is versatile and can be used or adapted for different applications.

It is advantageous to provide a microfluidic cartridge that is compact, economical and easy to install and replace.

Objects of the invention have been achieved by providing a biological sample processing system according to claim 1.

Objects of the invention have been achieved by providing a microfluidic cartridge according to claim 10.

Disclosed herein is a biological sample processing system comprising an imaging unit comprising a digital image processing system and at least one microscope including at least one lens, a sample processing station comprising a handling platform including a support and a displacement mechanism for moving the support, and a sample processing unit mounted on the handling platform. The sample processing unit comprises a tissue slide holder for mounting thereon a tissue slide with a biological sample fixed thereon and a microfluidic cartridge holder for mounting a microfluidic cartridge thereon. The tissue slide holder is coupled to the microfluidic cartridge holder via a coupling allowing the microfluidic cartridge and the tissue support to be mounted and removed from the sample processing unit in an opened position, and in a closed position for the tissue support to be in sealing contact with the microfluidic cartridge.

The sample processing station comprises a plurality of said sample processing units mounted on the handling platform and moveable from a position allowing mounting of the tissue slide, respectively microfluidic cartridge, or removal thereof, to a position in which the viewing window in the microfluidic cartridge holder is positioned in alignment with the lens of said at least one microscope.

In an advantageous embodiment, the microfluidic cartridge holder window comprises a recess within which the lens is partially inserted in the imaging position.

In an advantageous embodiment, the sample processing station comprises at least three, preferably four or more sample processing units.

In an advantageous embodiment, the handling platform comprises a rotating displacement mechanism for rotating the support between positions.

In an advantageous embodiment, each sample processing unit is coupled to at least one reagent supply tube and at least one reagent outlet tube.

In an advantageous embodiment, each sample processing unit comprises a clamping mechanism including a locking mechanism and a pressure actuator configured to apply pressure on the tissue support against the microfluidic cartridge in a closed position, the clamping mechanism comprising a compressed gas piston.

In an advantageous embodiment, each sample processing unit comprises a temperature control system including a cooling and heating system coupled to the tissue slide holder.

In an advantageous embodiment, the microfluidic cartridge holder and tissue holder are pivotally coupled together via a hinge coupling.

In an advantageous embodiment, the microfluidic cartridge holder is in a form of a moveable lid and the tissue slide holder in a form of a base statically fixed to the support of a handling platform.

In an advantageous embodiment, the microfluidic cartridge holder viewing window comprises a chamfered recess.

Also disclosed herein, is a microfluidic cartridge for a biological sample processing system comprising a substrate, a fluid flow network formed within the substrate, a seal mounted on the substrate, a cavity of a reaction chamber formed in the substrate, and a viewing window, the microfluidic cartridge configured to be placed against a tissue support to cover said cavity and constitute a side of the reaction chamber, the reaction chamber thus being formed between the tissue support and microfluidic cartridge. The fluid flow network comprises an inlet, inlet channel network and a plurality of chamber entry orifices. The fluid flow network further comprises an outlet, outlet channel network, and a plurality of chamber exit orifices. The chamber entry orifices and chamber exit orifices are arranged on opposed sides of the cavity of the reaction chamber for flow of reagents through the reaction chamber. The seal surrounds the cavity of the reaction chamber and chamber entry and exit orifices.

The viewing window comprises a transparent cover less than 1 mm thick and having an outer surface within a recess formed in the substrate of the viewing window relative to an outer surface of the substrate, configured to enable a lens of a microscope to be partially inserted in said viewing window recess.

In an advantageous embodiment, the transparent cover is made of glass or sapphire.

In an advantageous embodiment, the transparent cover has a thickness of less than 0.5 mm, preferably of less than 0.3 mm thickness.

In an advantageous embodiment, the cartridge further comprises spacer elements defining a height of the reaction chamber when a tissue support is placed and pressed thereagainst.

The spacer element may be in the form of a continuous or partially continuous protuberance, or preferably of discrete spaced apart protuberances.

In an advantageous embodiment, the spacer elements are arranged on an outer side of the seal with respect to the reaction chamber.

In an advantageous embodiment, the seal is mounted in a groove in the substrate

Further objects and advantageous features of the invention will be apparent from the claims, from the detailed description, and annexed drawings, in which:

FIGS. 3a and 3b are perspective views of a sample processing unit of sample processing station according to embodiments of the invention, in the open position (FIG. 3a) and closed position (FIG. 3b);

FIG. 3c is a perspective view in cross-section of a sample processing unit of sample processing station according to embodiments of the invention, in the closed position;

FIGS. 4a and 4b are top and bottom side perspective views of a microfluidic cartridge of a biological sample processing system according to embodiments of the invention;

Figure 1:
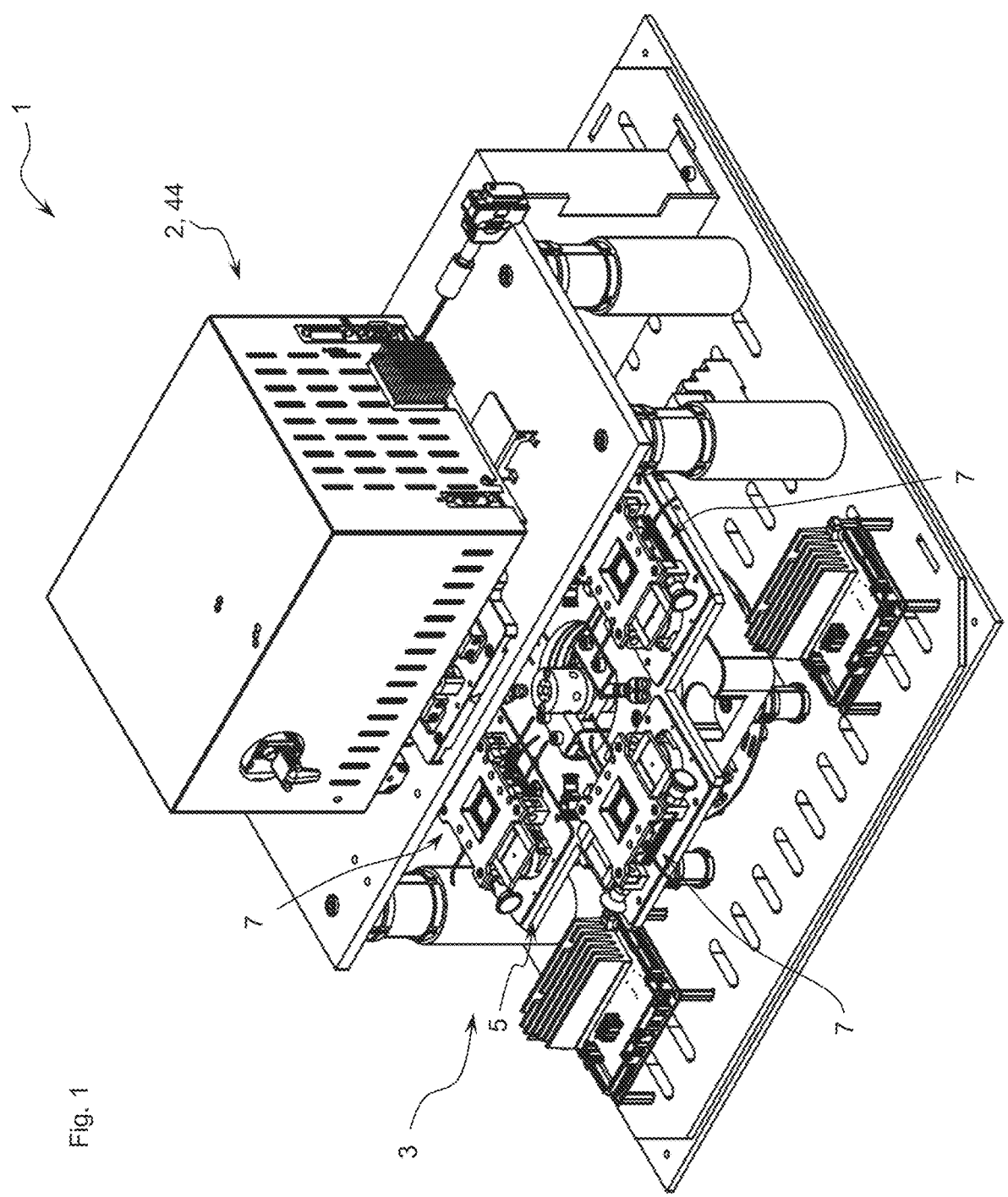
FIG. 1 is a schematic perspective view of a biological sample processing system according to an embodiment of the invention.
Figure 2:
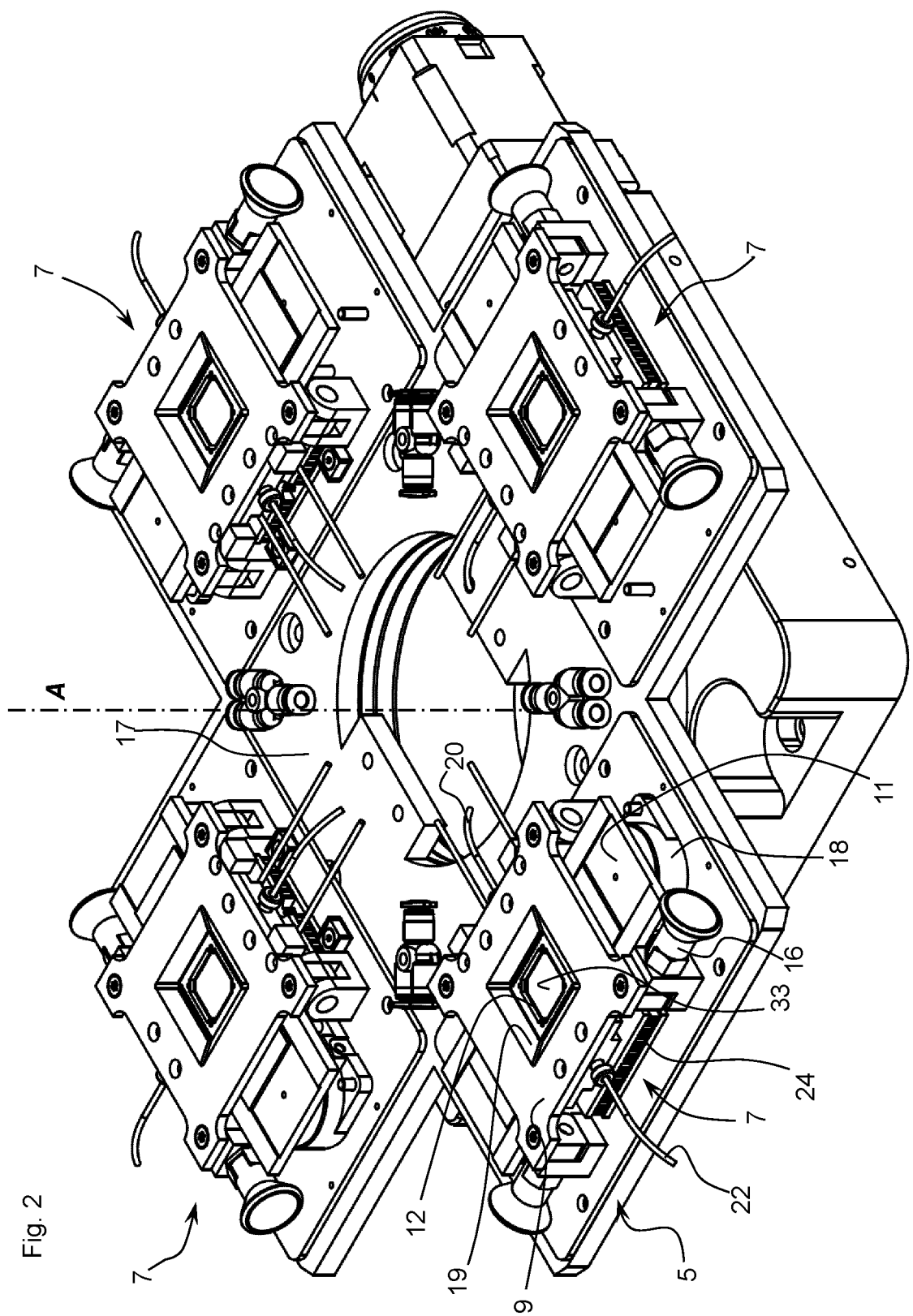
FIG. 2 is a schematic perspective view of main components of a sample processing station of a biological sample processing system according to an embodiment of the invention.
Figure 5:
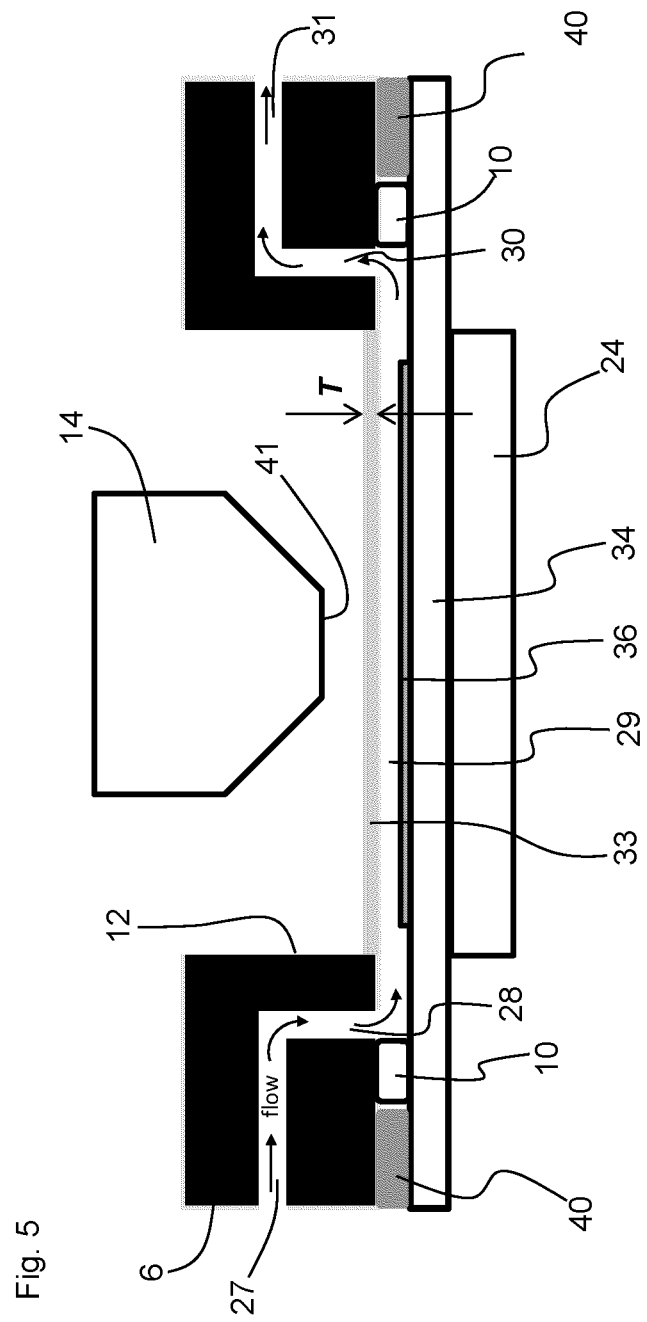
FIG. 5 is a schematic enlarged cross sectional view of a microfluidic cartridge mounted on a sample slide in a biological sample processing system according to an embodiment of the invention.

Referring to the figures, a biological sample processing system according to embodiments of the invention comprises an imaging unit 2, a sample processing station 3, and a plurality of microfluidic cartridges 4 mounted in the sample processing station 3. The biological sample processing system 1 is for analyzing biological tissue samples 36 that may be fixed to a support 34.

The support 34 may be in form of a conventional microscope slide, for instance made of glass and having typical dimensions of 3×2 cm surface area and about 1 mm thickness. Such microscope slides are widely used for fixing tissue samples for placement under a microscope objective to analyze the samples manually or by an automated imaging system. Other supports, whether conventional or not, may however also be used for fixing a tissue sample for analysis with an imaging system according to embodiments of the invention. Preferably the support is transparent in order to provide a light source beneath the sample, although within scope of the invention the support may be opaque and a light for imaging may be provided from the viewing side of the sample.

Various tissue samples may be analysed, examples having been provided in the introductory section herein above.

An application that benefits from the advantageous features of the present invention includes analysis of tissue samples from biopsies that are taken just preceding the analysis and where rapid analysis of the tissue is required. This may for instance occur during biopsies of a possible cancer. In particular, an application in which rapid generation of results is very advantageous is during surgical removal of cancerous tissue, in order to verify that all of the cancer cell bearing tissue has been completely removed. The analysis may thus be performed during surgery and prior to completing the surgical operation. The present invention enables tissue sample processing to be performed in less than one hour, preferably less than forty five minutes, possibly less than thirty minutes.

Biological processing system according to embodiments of the invention may however be used in other applications that do not require such rapid output of results, however that benefit from rapid, reliable and efficient analysis of tissue samples. One of the sought after advantages is to reduce the amount of tissue required for analysis in order to ensure that the biopsy process is as minimally invasive as possible.

The imaging unit 2 comprises one or more microscopes, each having at least one lens 14, and a digital image processing system (internal details not explicitly illustrated) comprising an image capture sensor and associated electronic circuit and software for capturing and processing images viewed through the microscope lens. Imaging systems for capture, processing and storage of images are per se well known and do not need to be further described herein.

The biological sample processing system may further comprise a reagent storage and delivery module (not shown) for supplying reagents, buffer solutions, and washing solutions to the sample processing station, in particular for flow through a reaction chamber 29 of the microfluidic cartridge 4 for analysis of the sample.

The sample processing station 3 comprises a handling platform 5 and a plurality of sample processing units 7 mounted on the support 17 of the handling platform 5. The handling platform 5 further comprises a displacement mechanism (not shown) for moving the support 17 and/or the sample processing unit 7 on the support in order to move the sample processing unit 7 between a position below the microscope lens 14 to at least a position for loading and unloading of a tissue slide 34 from a sample processing unit 7.

In an embodiment, the displacement mechanism may comprise a rotating coupling, for instance arranged below the support 17 for rotation of the support about a central axis. In the illustrated embodiment, the plurality (here four are shown) of sample processing units 7 are rotated about the centre axis A between loading and viewing positions and any other positions (e.g. waiting positions).

In another embodiment (not shown), the sample processing station may comprise for instance only two sample processing units that are mounted on a slide of the displacement mechanism for translation between viewing and loading positions.

Various combinations of rotational and/or translational axes of displacement may however be implemented in displacement mechanisms within the scope of the invention.

Each sample processing unit 7 comprises a microfluidic cartridge holder 9, a tissue holder 11, and a coupling 13 therebetween to allow movement of the cartridge holder 9 relative to the tissue slide holder 11 for mounting and dismounting of the tissue slide 34. In the illustrated embodiment, the microfluidic cartridge holder is provided in a form of a lid rotatably coupled via a hinge forming the coupling 13 to a base forming the tissue slide holder 11.

Within the scope of the invention, it may however also be envisaged to have the microfluidic cartridge holder as the base and the tissue slide holder as the lid moveably mounted to the base. This configuration can for example be used in combination with inverted microscopy.

The base is fixedly mounted to the handling platform 5 of the sample processing station 3.

The coupling 13 may be provided in other forms instead of a pivot hinge, for instance by means of link arms or a slide allowing the microfluidic cartridge holder to be moved away from the base holding the tissue slide holder 11, in a translation movement or a combined translational and rotational movement. The coupling 13 in a form of a pivot hinge is however simple and robust and corresponds to a preferred embodiment.

The microfluidic cartridge holder 9 advantageously comprises a viewing window 19 with a recess 43 configured to receive at least partially therein a lens 14 of the microscope such that the microscope lens may be positioned very close to a viewing window 12 of the microfluidic cartridge. A lens with a very large numerical aperture may thus be used to improve the quality of image capture of the sample under observation.

A sample processing unit 7 further advantageously comprises a clamping mechanism 15 including a locking mechanism 16 and a pressure actuator 18. The pressure actuator 18 may comprise a piston driven by a compressed fluid, for instance a compressed air piston 37, that applies pressure on the tissue slide 34 against the microfluidic cartridge 4. The pressure ensures that a seal 10 arranged between a substrate 6 of a microfluidic cartridge 4 and the tissue slide 34 is hermetically closed to withstand a pressure in the reaction chamber 29 during injection of reagent and other fluids in the reaction chamber. The pressure applied by the pressure actuator ensures that the maximum pressure attained in the reaction chamber does not cause the seal 10 to leak.

The locking mechanism 16 may for instance be in the form of a one or more locking pins inserted into corresponding orifices in a locking flange or tab on the other of the lid or base. Within the scope of the invention, the locking mechanism may however have other configurations, for instance a pivotable arm with a catch shoulder engaging a corresponding catch shoulder on the other of the lid or base parts.

The moveable part of the microfluidic cartridge holder or tissue slide holder may be actuated manually or may include a motorized actuation mechanism (not shown) and similarly the locking mechanism may be manually operated or may include a motorized actuation system for automatic opening and closing of the moveable and static parts.

The sample processing unit 7 further comprises a reagent fluid flow system for directing the flow of reagents and other fluids from the external reagent source to the microfluidic cartridge 4. The reagent fluid flow system thus comprises inlet couplings for reagent conduits such as reagent tubes for the inlet and outlet of reagents, and an interface surrounded by a sealing element that couples to the fluid flow network 8 on the microfluidic cartridge 4.

The clamping mechanism 15, when pressing the tissue slide 34 against the microfluidic cartridge 4 may also serve to push the microfluidic cartridge against the tissue slide holder 11 to ensure tight sealing at the interface between the inlet and outlet on the microfluidic cartridge and the corresponding outlets and inlets on the reagent fluid flow system within the microfluidic cartridge holder 9.

The sample processing unit may further comprise a temperature control system 24 for cooling and/or heating of the tissue slide 34 in view of heating or cooling the reagents within the reaction chamber 29 during tissue sample processing, in particular for the purposes of multiplexing. The temperature control system 24 may advantageously comprise a Peltier chip 31 positioned in or under the base forming the tissue slide holder 11. In a variant, the temperature control system may further comprise heating and/or cooling elements positioned for heating and/or cooling around the reagent fluid flow system within the sample processing unit, in particular to pre-heat or pre-cool reagents entering into the reaction chamber 29.

The microfluidic cartridge according to the embodiment of the invention comprises a substrate 6, a fluid flow network 8 formed within the substrate 6, a seal 10 and a viewing window 12. The fluid flow network 8 comprises an inlet 26 for coupling to the reagent fluid flow system in the base of the sample processing unit 7, an outlet 32 for outflow of reagents from the reaction chamber 29, and an inlet channel network 27 and outlet channel network 31 connected respectively to chamber entry orifices 28 and chamber exit orifices 30. The fluid flow network is configured to provide a substantially uniform flow of reagents through the reaction chamber 29, intended to ensure substantially advective transport of reagents into the biological sample 36 fixed on the tissue support 34.

The seal 10 is mounted in a groove in a substrate 6 that surrounds the reaction chamber 29 as well as the chamber entry orifices and exit orifices 28, 30. The reaction chamber 29 is formed between the tissue support 34 and the viewing window 12 enclosed by the seal 10 sandwiched between the substrate 6 and tissue support 34.

The microfluidic cartridge 4 may advantageously further comprise spacer elements 40, for instance advantageously in a form of a continuous rim or a plurality of discreet protuberences arranged preferably on an outer side of the seal 10. The spacer elements ensure that the height of the reaction chamber 29 is maintained at a defined constant height that is not dependent on the compression force on the seal 10 supplied by the pressure actuator 18. The force of the pressure actuator and clamping mechanism 15 is arranged to be sufficient to compress the seal 10 until the spacer elements 40 are in contact with the tissue support 34, whereby excess pressure does not further compress the seal or change the reaction chamber height due to the rigid spacer elements. The spacer elements also advantageously ensure that the viewing window 12 remains in a parallel relationship with the tissue support 34 and does not tilt with respect thereto.

The viewing window 12 comprises a transparent cover 33 having a thickness of less than 1 mm, preferably less than 0.5 mm, for instance around 0.2 mm (e.g. 0.17 mm). The transparent cover 33 may advantageously be made of glass or of sapphire. The transparent cover 33 may be separately formed from the substrate 6 and assembled thereto by adhesive bonding, by welding, or by overmolding with a material of the substrate 6. The viewing window 12 comprises a recess relative to an outer surface of the substrate 6, configured to enable a lens of a microscope to be partially inserted in said viewing window recess so as to be very close to the surface of the transparent cover 33 and to the tissue sample thereunder, as further discussed below.

The substrate 6 may advantageously be formed of a molded polymer, for instance an injection molded polymer such as COP, COC, PC, PSU and PEEK that may be transparent or opaque.

The thin transparent cover 33 and recess of the viewing window 12 allows a viewing face 41 of a microscope lens 14 to be placed at a distance from the reaction chamber 29 of less than 1 mm, in particular of less than 0.5 mm, such that the distance from the tissue sample to the microscope lens is typically less than 1 mm considering that the reaction chamber height is in a range of 0.05 to 0.5 mm. The height of the spacer elements is advantageously in a range of 0.05 to 0.3 mm preferably in a range of 0.05 to 0.2 mm in order to have an optimal flow of reagents through the reaction chamber and advective transport of reagents to the tissue support.

A high numerical aperture microscope lens may thus be used to capture a large surface area of the tissue sample through successive imaging steps, for instance in a range of 80 mm$^2$ to 120 mm$^2$, typically in a range of 80 mm$^2$ to 100 mm$^2$, thus allowing good image capture and analysis of a section of tissue sample exceeding 50 mm$^2$. The very thin transparent cover which may advantageously be made of a material such as glass reduces artefacts and aberrations on the image captured by the microscope lens 14 for high performance sample analysis.

A plurality of sample processing units mounted on the handling platform advantageously allows processing of tissue samples with reagents while simultaneously performing image capture and analysis of other samples positioned under the microscope in order to increase rapidity of analysis of samples, especially during multiplexing.

For instance each of the plurality of sample processing units 7 may be at a different stage of a multiplex process, in other words with different reagents, the sample processing units being sequentially advanced to the lens of the imaging unit. Also loading and unloading of tissue samples 36 may be performed on certain sample processing units 7 while others are being analyzed by the imaging unit 2 or having reagents being injected in reaction chamber for subsequent analysis.

The plurality of sample processing units comprises preferably three or more sample processing units, preferably four or more sample processing units on the common handling platform 5.

It may be noted that for analysis of a biopsy tissue sample, the sample of tissue from a same patient may be distributed on a plurality of a tissue slides placed in the various corresponding sample processing units 7 such that various different reagents and analysis can be performed on the tissue samples simultaneously. Alternatively, the same reagents and analysis may be performed in order to provide a plurality of test results that may be compared for increasing the reliability of the diagnosis. Alternatively, the plurality of sample stations may also be used to perform analysis of different tissue samples from a same patient or from different patients.

LIST OF REFERENCES USED biological sample processing system 1
imaging unit 2
microscope
lens 14
viewing face 41
image processing system
sample processing station 3
handling platform 5
support 17
displacement mechanism (not shown)
sample processing unit 7
microfluidic cartridge holder 9
(lid)
viewing window 19
chamfered recess 43
tissue slide holder 11
base
coupling 13
hinge
clamping mechanism 15
locking mechanism 16
locking pin
pressure actuator 18 piston
compressed air piston
reagent fluid flow system
inlet conduits 20
outlet conduits 22
temperature control system 24
cooling/heating system
peltier chip 41
temperature sensor (not shown)
microfluidic cartridge 4
substrate 6
fluid flow network 8
cartridge inlet 26
inlet channels 27
chamber entry orifices 28
reaction chamber 29
chamber exit orifices 30
outlet channels 31
cartridge outlet 32
seal 10
viewing window 12
transparent cover 33
glass layer
spacer elements 40
tissue support 34
tissue sample 36
external reagent sources
reagent tubes
Thickness of transparent cover T

The invention claimed is:

1. A biological sample processing system comprising:
an imaging unit having a digital image processing system and at least one microscope including at least one lens;
a sample processing station comprising a handling platform including a support and a displacement mechanism for moving the support; and
a sample processing unit mounted on the handling platform, wherein the sample processing unit comprises a tissue slide holder configured for mounting thereon a tissue slide with a biological sample fixed thereon and a microfluidic cartridge holder configured for mounting a microfluidic cartridge thereon, the tissue slide holder is coupled to the microfluidic cartridge holder via a coupling allowing the microfluidic cartridge and a tissue support to be mounted and removed from the sample processing unit in an opened position and in a closed position for the tissue support to be in sealing contact with the microfluidic cartridge in a closed position, the sample processing station comprises a plurality of said sample processing units mounted on the handling platform and moveable from a position allowing mounting of the tissue slide, respectively microfluidic cartridge, or removal thereof, to a position in which a viewing window in the microfluidic cartridge holder is positioned in alignment with the at least one lens of said at least one microscope, and each sample processing unit is coupled to at least one reagent supply tube and at least one reagent outlet tube such that image capture, reagent-based processing of the biological sample, and mounting or removal of the tissue slide can be performed simultaneously across a plurality of said sample processing units.

2. The biological sample processing system according to claim 1, wherein the microfluidic cartridge holder viewing window comprises a recess within which the lens is partially inserted in the imaging position.

3. The biological sample processing system according to claim 1, wherein the sample processing station comprises at least three or more sample processing units.

4. The biological sample processing system according to claim 1, wherein the handling platform comprises a rotating displacement mechanism for rotating the support between positions.

5. The biological sample processing system according to claim 1, wherein each sample processing unit comprises a clamping mechanism including a locking mechanism and a pressure actuator configured to apply pressure on the tissue support against the microfluidic cartridge in a closed position, and the clamping mechanism comprises a compressed gas piston.

6. The biological sample processing system according to claim 1, wherein each sample processing unit comprises a temperature control system including a cooling and heating system coupled to the tissue slide holder.

7. The biological sample processing system according to claim 1, wherein the microfluidic cartridge holder and tissue holder are pivotally coupled together via a hinge coupling.

8. The biological sample processing system according to claim 1, wherein the microfluidic cartridge holder is in a form of a moveable lid and the tissue slide holder in a form of a base statically fixed to the support of a handling platform.

9. The biological sample processing system according to claim 1, further comprising a plurality of microfluidic cartridges.

10. A microfluidic cartridge for a biological sample processing system comprising:
a substrate;
a fluid flow network formed within the substrate;
a seal mounted on the substrate;
a cavity of a reaction chamber formed in the substrate; and
a viewing window, wherein the microfluidic cartridge is configured to be placed against a tissue support to cover said cavity and constitute a side of the reaction chamber, the reaction chamber thus being formed between the tissue support and microfluidic cartridge, the fluid flow network comprises an inlet, inlet channel network and a plurality of chamber entry orifices, and the fluid flow network further comprises an outlet, outlet channel network, and a plurality of chamber exit orifices, the chamber entry orifices and chamber exit orifices are arranged on opposed sides of the cavity of the reaction chamber for flow of reagents through the reaction chamber, the seal surrounding the cavity of the reaction chamber and chamber entry and exit orifices, and the viewing window comprises a transparent cover less than 1 mm thick and having an outer surface within a recess formed in the substrate of the viewing window relative to an outer surface of the substrate, configured to enable a lens of a microscope to be partially inserted in said viewing window recess.

11. The microfluidic cartridge according to claim 10, wherein the transparent cover is made of glass or sapphire.

12. The microfluidic cartridge according to claim 10, wherein the transparent cover has a thickness of less than 0.5 mm or less than 0.3 mm thickness.

13. The microfluidic cartridge according to claim 10, further comprising rigid spacer elements defining a height of the reaction chamber when a tissue support is placed and pressed thereagainst.

14. The microfluidic cartridge according to claim 13, wherein the rigid spacer elements are arranged on an outer side of the seal with respect to the reaction chamber.

\* \* \* \* \*